US009506945B2

(12) United States Patent
Sane et al.

(10) Patent No.: US 9,506,945 B2
(45) Date of Patent: Nov. 29, 2016

(54) ROTORCRAFT FLIGHT PARAMETER ESTIMATION

(71) Applicant: Sikorsky Aircraft Corporation, Stratford, CT (US)

(72) Inventors: Harshad S. Sane, Southbury, CT (US); Joseph T. Driscoll, Prospect, CT (US); Igor Cherepinsky, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 64 days.

(21) Appl. No.: 14/682,733

(22) Filed: Apr. 9, 2015

(65) Prior Publication Data

US 2016/0054350 A1    Feb. 25, 2016

Related U.S. Application Data

(60) Provisional application No. 62/010,240, filed on Jun. 10, 2014.

(51) Int. Cl.
| | |
|---|---|
| *B64C 27/00* | (2006.01) |
| *G01P 5/16* | (2006.01) |
| *B64C 13/16* | (2006.01) |
| *B64D 43/02* | (2006.01) |
| *G01P 5/02* | (2006.01) |
| *B64C 5/02* | (2006.01) |
| *B64C 5/10* | (2006.01) |
| *B64C 27/82* | (2006.01) |

(52) U.S. Cl.
CPC .............. *G01P 5/16* (2013.01); *B64C 13/16* (2013.01); *B64C 27/00* (2013.01); *B64D 43/02* (2013.01); *G01P 5/02* (2013.01); *B64C 5/02* (2013.01); *B64C 5/10* (2013.01); *B64C 2027/8263* (2013.01)

(58) Field of Classification Search
None
See application file for complete search history.

(56) References Cited

U.S. PATENT DOCUMENTS

| | | | |
|---|---|---|---|
| 3,075,727 A | 1/1963 | Ellis | |
| 4,103,848 A | 8/1978 | Johnson | |
| 4,702,106 A | 10/1987 | Hassenpflug et al. | |
| 4,767,085 A | 8/1988 | Boudreau | |
| 4,893,261 A * | 1/1990 | Flint, III | ............... G01P 13/02 244/17.13 |

(Continued)

FOREIGN PATENT DOCUMENTS

| | | |
|---|---|---|
| CA | 2863168 A1 | 8/2013 |
| EP | 1462806 A1 | 9/2004 |

(Continued)

OTHER PUBLICATIONS

Extended European Search Report issued on Oct. 6, 2015 in corresponding EP Patent Application No. 15163130, 4 pages.

*Primary Examiner* — Richard G Davis
(74) *Attorney, Agent, or Firm* — Cantor Colburn LLP

(57) ABSTRACT

An aircraft is provided and includes an airframe. The airframe includes first and second rotor apparatuses at upper and tail portions of the aircraft, respectively, to provide for control and navigational drive. The aircraft further includes a stabilizer component disposed at the tail portion in a position displaced from downwash of the first and second rotor apparatuses at airspeed ranges and a control system configured to apply a dither actuation signal to the stabilizer component at the airspeed ranges by which an aircraft response to a stabilizer component input is measurable for airspeed estimation purposes.

15 Claims, 3 Drawing Sheets

(56) References Cited

U.S. PATENT DOCUMENTS

| | | | |
|---|---|---|---|
| 5,063,777 A * | 11/1991 | Arethens | G01P 5/00 701/14 |
| 5,102,072 A * | 4/1992 | Egan | G05D 1/0825 244/181 |
| 5,214,596 A * | 5/1993 | Muller | G01P 5/00 244/17.13 |
| 5,678,786 A | 10/1997 | Osder | |
| 5,901,272 A * | 5/1999 | Schaefer, Jr. | G01P 13/025 701/7 |
| 6,200,096 B1 | 3/2001 | Kohlhepp | |
| 6,295,006 B1 | 9/2001 | Kohlhepp | |
| 6,352,220 B1 | 3/2002 | Banks | |
| 6,769,872 B2 | 8/2004 | Torok | |
| 6,830,214 B2 | 12/2004 | Carson | |
| 6,932,569 B2 | 8/2005 | Torok | |
| 7,931,238 B2 | 4/2011 | Builta | |
| 7,970,498 B2 | 6/2011 | Sahasrabudhe | |
| 8,014,910 B2 | 9/2011 | Mathieu | |
| 2011/0285984 A1 * | 11/2011 | Christian | G01P 5/26 356/28.5 |
| 2012/0256041 A1 | 10/2012 | Desroche | |
| 2013/0311011 A1 | 11/2013 | Malta | |
| 2013/0325218 A1 * | 12/2013 | Spoldi | B64C 13/503 701/14 |
| 2014/0358333 A1 * | 12/2014 | White | G01P 5/02 701/14 |

FOREIGN PATENT DOCUMENTS

| | | |
|---|---|---|
| EP | 2669687 A1 | 12/2013 |
| GB | 2312408 A | 10/1997 |
| WO | 2013174559 A1 | 11/2013 |

* cited by examiner

ROTORCRAFT FLIGHT PARAMETER ESTIMATION

FEDERAL RESEARCH STATEMENT

This invention was made with government support under W911W6-10-2-0004 awarded by AATD. The government has certain rights in the invention

CROSS REFERENCE TO RELATED APPLICATION

This application is a Non-Provisional of U.S. Application No. 62/010,240 filed Jun. 10, 2014, the disclosures of which are incorporated by reference herein in its entireties.

BACKGROUND OF THE INVENTION

The subject matter disclosed herein relates to rotorcraft flight parameter estimation and, more particularly, to rotorcraft airspeed estimation using a horizontal stabilizer input.

Information reflective of airspeed of an aircraft, such as a helicopter, is commonly obtained using pitot-static tubes that are typically mounted near the front of the helicopter. Airspeed is a key regime recognition parameter that is used to schedule control gains and to operate trim devices to guarantee high levels of handling qualities and stability margins. These control gains and trim devices, such as a horizontal stabilizer, are scheduled using a blended airspeed variable that is a combination of ground speed and airspeed depending on the reliability of each measurement. For UH-60 helicopters, as an example, at airspeeds above about 30 knots, the pitot-static tubes are not in the downwash of the rotor system and therefore the airspeed measurement is held to be relatively highly accurate for that flight regime.

Depending on the criticality of airspeed for flight controls and survivability of the aircraft, sensor failure can be an issue for current aircraft. Sensor failure can occur, for example, when the pitot-static tubes are clogged with ice or dust.

BRIEF DESCRIPTION OF THE INVENTION

According to one aspect of the invention, an aircraft is provided and includes an airframe. The airframe includes first and second rotor apparatuses at upper and tail portions of the aircraft, respectively, to provide for control and navigational drive. The aircraft further includes a stabilizer component disposed at the tail portion in a position displaced from downwash of the first and second rotor apparatuses at airspeed ranges and a control system configured to apply a dither actuation signal to the stabilizer component at the airspeed ranges by which an aircraft response to a stabilizer component input is measurable for airspeed estimation purposes.

In accordance with additional or alternative embodiments, an airspeed sensing system is disposed at a forward portion of the airframe.

In accordance with additional or alternative embodiments, the stabilizer component is displaced from downwash of the first and second rotor apparatuses below and above an airspeed range of about 10-35 knots.

In accordance with additional or alternative embodiments, the stabilizer component includes a horizontal stabilizer.

In accordance with additional or alternative embodiments, the control system is a component of an on-board flight computer.

In accordance with additional or alternative embodiments, the control system applies the dither actuation signal to a baseline stabilizer component control signal.

In accordance with additional or alternative embodiments, the control system includes a modeling unit disposed to be receptive of data reflective of the aircraft response to the baseline stabilizer component control signal and the dither actuation signal and configured to determine an effect of dither actuation signal application.

In accordance with additional or alternative embodiments, the control system further includes a filtering unit interposed between the stabilizer component and the modeling unit, the filtering unit being configured to remove noise from the data prior to the data being received by the modeling unit.

In accordance with additional or alternative embodiments, the control system further includes a correction unit configured to iteratively correct modeling unit inaccuracy.

In accordance with additional or alternative embodiments, control system further includes a correction unit configured to correct modeling unit inaccuracy by reference to multi-variable sensitivity data versus airspeed.

In accordance with another aspect, an airspeed estimation method for use with an aircraft including a stabilizer component displaced from rotor downwash at airspeed ranges. The method includes measuring an aircraft response to a baseline stabilizer component control signal at the airspeed ranges, measuring an aircraft response to the baseline stabilizer component control signal including a dither actuation signal at the airspeed ranges and comparing the measured aircraft responses and estimating an airspeed of the aircraft from a result of the comparing.

In accordance with additional or alternative embodiments, the method further includes obtaining the airspeed of the aircraft from an airspeed sensing system disposed at a forward portion of an airframe of the aircraft.

In accordance with additional or alternative embodiments, the method further includes filtering noise from data reflective of the aircraft responses.

In accordance with additional or alternative embodiments, the method further includes iteratively correcting data reflective of the aircraft responses.

In accordance with additional or alternative embodiments, the method further includes correcting data reflective of the aircraft responses by reference to multi-variable sensitivity data versus airspeed.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

The detailed description explains embodiments of the invention, together with advantages and features, by way of example with reference to the drawings.

As will be described below, an analytical estimation of helicopter airspeed as a redundancy source in lieu or in support of existing airspeed sensors for the purposes of vehicle management systems and flight control is provided. A dither actuation signal is applied to a horizontal stabilizer in order to measure sensitivity in aircraft responses. The measured sensitivity is then used to estimate airspeed. The dither actuation signal particularly results in a closed-loop aircraft response that is proportional to forces normally exerted by the horizontal stabilizer such that aircraft responses can be cross-correlated with stabilizer pitch responses with airspeed computed based on a lift/drag response model.

Figure 1:
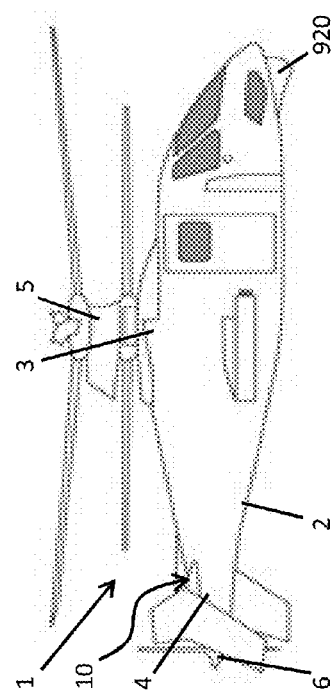
FIG. 1 is a schematic side view of an aircraft in accordance with embodiments.
Figure 2:
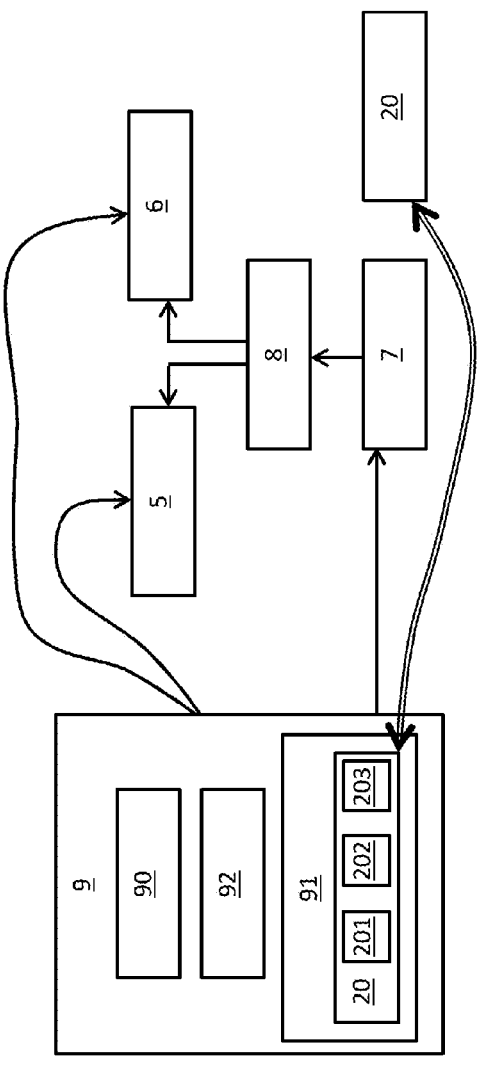
FIG. 2 is a schematic diagram of components of the aircraft of FIG. 1.

With reference to FIGS. 1 and 2, an aircraft 1 includes an airframe 2. The airframe 2 may be formed to define a cabin that can accommodate a pilot and at least one or more crewmen or passengers and has an upper portion 3 and a tail portion 4. A first rotor apparatus 5 is operably disposed at the upper portion 3 and a second rotor apparatus 6 is operably disposed at the tail portion 4. The first rotor apparatus 5 may be provided as a single rotor or as coaxial counter-rotating rotors. The second rotor apparatus 6 may be provided as a tail rotor or a propeller. In either case, operations of the first rotor apparatus 5 and the second rotor apparatus 6 relative to the airframe 2 drive flight and navigational operations of the aircraft 1.

As shown in FIG. 2, the airframe 2 is further formed to encompass an engine 7, a transmission 8 and a flight computer 9, which is operably coupled to the first rotor apparatus 5, the second rotor apparatus 6, the engine 7 and the transmission 8. In accordance with commands issued by the flight computer 9, the engine 7 drives the operations of the first rotor apparatus 5 and the second rotor apparatus 6 via the transmission 8 for flight control and navigation purposes. The flight computer 9 additionally issues collective and cyclic servo commands to the first rotor apparatus 5 and the second rotor apparatus 6 to provide for additional flight controls and navigation.

The (on-board) flight computer 9 includes a memory unit 90, a processor unit 91 and a sensor system 92. The sensor system 92 may but is not required to include an airspeed sensing (or pitot-tube) system 920. The pitot-tube system 920 may be disposed at various points on the airframe 2, such as, but not limited to a forward portion of the airframe 2 and is configured to obtain a reading of an airspeed of the aircraft 1. The processor unit 91 receives information from the sensor system 92 and analyzes that information in accordance with executable instructions stored on the memory unit 90.

Although illustrated in FIGS. 1 and 2 as a piloted helicopter, it is to be understood that this is merely exemplary and that the aircraft 1 can be any type of ground- or air-based vehicle and can be manned, unmanned or remotely piloted.

The aircraft 1 further includes a stabilizer component 10 and a control system 20. The stabilizer component 10 is disposed at the tail portion 4 in a position at which the stabilizer component 10 is displaced from downwash of the first and second rotor apparatuses 5 and 6 at airspeed ranges. The stabilizer component 10 has a movable, balanced surface that can be moved (i.e., pitched about an aerodynamic center) by a pilot to generate a given pitching moment. The stabilizer component 10 may be provided as a horizontal stabilizer that is displaced from downwash of the first and second rotor apparatuses at an airspeed range of about 0-10 knots and at an airspeed range exceeding about 35 knots (hereinafter referred to as the "airspeed ranges").

The control system 20 may be provided as a component of the flight computer 9 generally or a component of the processor unit 91 particularly. The control system 20 is coupled to the stabilizer component 10 and configured to apply a dither actuation signal to the stabilizer component 10 at the airspeed ranges by which aircraft responses are measurable for airspeed estimation purposes. More particularly, the control system 20 applies the dither actuation signal on top of a baseline actuation signal to the stabilizer component 10 and estimates the airspeed of the aircraft 1 from aircraft responses to the applied signal(s). This airspeed estimation method can be used as a redundancy source or in lieu of the sensor system 92.

Figure 3:
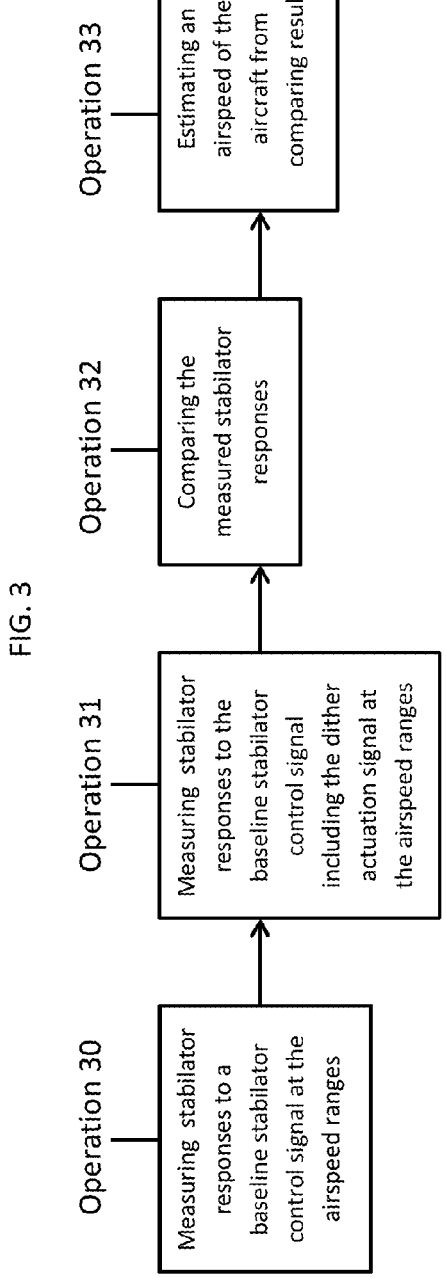
FIG. 3 is a flow diagram illustrating a method of airspeed estimation in accordance with embodiments.
Figure 4:
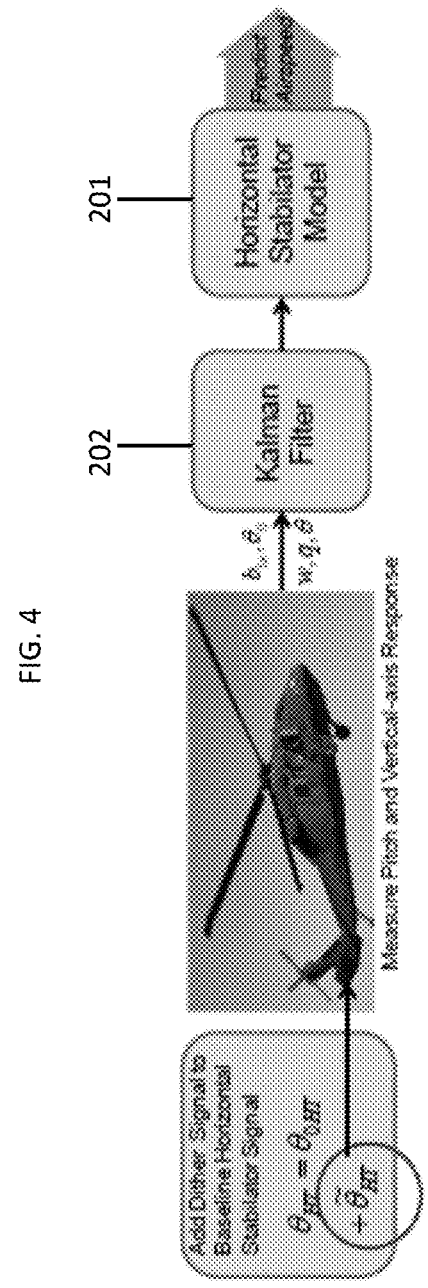
FIG. 4 is a flow diagram illustrating embodiments of the method of FIG. 3.
Figure 5:
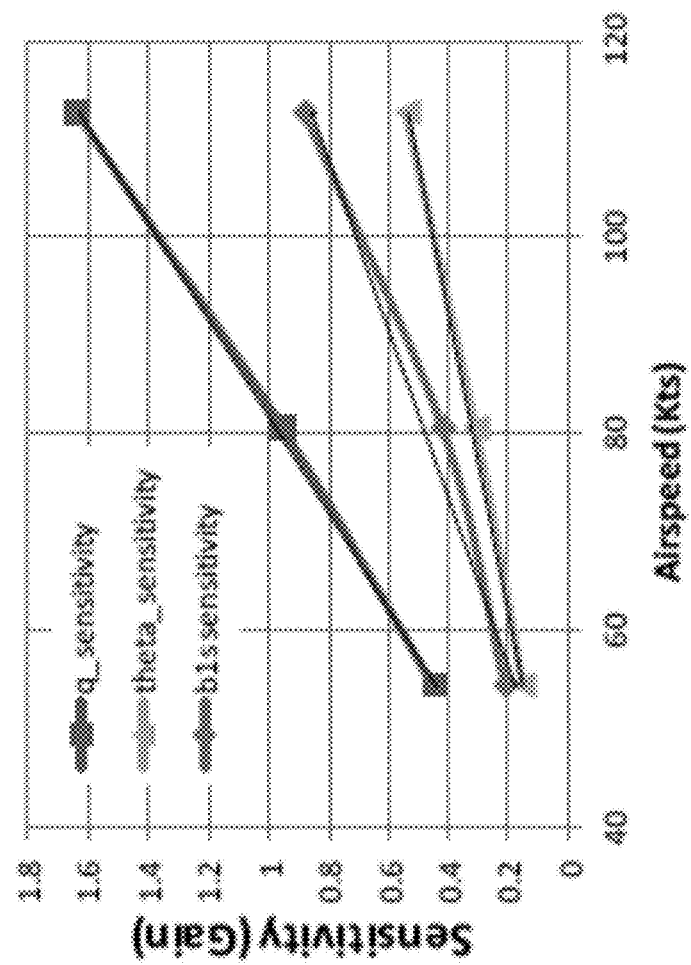
FIG. 5 is a graphical depiction of a look-up table for use in the method of FIG. 3.

With reference to FIGS. 3-5, the control system 20 measures aircraft responses to a baseline stabilizer component control signal at the airspeed ranges (operation 30), measures aircraft responses to the baseline stabilizer component control signal including the dither actuation signal at the airspeed ranges (operation 31) and compares the measured aircraft responses (operation 32) and estimates an airspeed of the aircraft from a result of the comparing (operation 33).

In accordance with embodiments, the control system 20 may include a modeling unit 201, a filtering unit 202 and a correction unit 203. The modeling unit 201 is disposed to be receptive of data reflective of responses of the aircraft 1 to the baseline stabilizer component control signal and to the baseline stabilizer component control signal including the dither actuation signal. The modeling unit 201 is configured to determine an effect of the application of the dither actuation signal to the stabilizer component 10 on top of the baseline stabilizer component signal. The filtering unit 202 is operably interposed between the stabilizer component 10 and the modeling unit 201 and is configured to remove noise from the data prior to the data being received by the modeling unit 201. The filtering unit 202 may be provided as a Kalman filter (see FIG. 4) or a system-identification method for pitch attitude dynamics. The correction unit 203 is configured to iteratively correct for inaccuracies of the modeling unit 201 and/or to correct for inaccuracies of the modeling unit 201 by reference to multi-variable sensitivity data versus airspeed (see FIG. 5).

In accordance with embodiments, the filtering unit 202 can be used to identify a pitch-axis authority (gain) of the stabilizer component 10. This gain is directly related to the moment arm for the pitch axis and lift of the stabilizer component 10. Pitch dynamics can be written as a first-order equation of the form $$q = -M_q q + M_\delta b_{1s} + M_{HT} \theta_{HT},$$

where q is pitch-rate, Mq is the pitch response pole, $M_\delta$ is control authority gain for the longitudinal cyclic input $b_{1s}$, $\theta_{HT}$ is the angular deflection of the stabilizer component 10 and gain $M_{HT}$ is the gain of the stabilizer component 10 to a pitch rate. In an open-loop case, the pitch response of the aircraft 1 can be used to interpret the pitch axis gain $M_{HT}$. In a closed-loop case, where the dither actuation signal would be rejected by the inner loop rate-command attitude-hold (RCAH) controller as a disturbance, the response of the controller $b_{1s}$ is used to identify $M_{HT}$.

As mentioned above, the gain $M_{HT}$ is directly related to the pitching-moment arm and lift of the stabilizer component 10, which is displaced from the downwash of the first and second rotor apparatuses 5 and 6 at low and high airspeeds. When the aircraft 1 assumes these airspeeds, the dynamic pressure and the aerodynamic forces of the stabilizer component 10 can be characterized since stabilizer component 10 aerodynamic models have been documented for effects of rotor wake, fuselage interference and inflow.

Based on such models, the dynamic pressure and airspeed at the stabilizer component 10 can be computed using a total aerodynamic force vector that includes drag and lift force components of the stabilizer component 10 aligned with its local aerodynamic axis, a dynamic pressure at the stabilizer component 10, a model for the effects of fuselage interference and rotor downwash, a rotor downwash skew angle and an angle of attack for the stabilizer component 10. That is, a total pitching moment of the stabilizer component 10 can be obtained and an airspeed of the aircraft 1 can be derived from the total pitching moment, the dynamic pressure, the rotor skew angle and the angle of attack.

In accordance with further embodiments, issues due to inaccuracies of the modeling unit 201 can introduce error in the estimate of the airspeed of the aircraft 1. These inaccuracies can be iteratively corrected, however, in the correction unit 203 by taking subsequent differences (peak-to-peak response) of signals input to the stabilizer component 10 and output from the stabilizer component 10. Alternatively, the inaccuracies can be corrected in the correction unit 203 by other methods as well. For example, simulations have shown that a sensitivity function for pitch rate, pitch attitude and $b_{1s}$ is fairly linear with airspeed (see FIG. 5). Thus, the relationships illustrated in FIG. 5 can be used as a "look-up table" for online prediction of airspeed of the aircraft 1 based on measured sensitivities of responses of the aircraft 1 to the baseline stabilizer component control signal and the dither actuation signal.

The methods of airspeed estimation described above provide for redundancy for the sensor system 92, increased envelope of air-speed estimation and possible reductions in aircraft 1 cost/weight. The methods can be extended to any articulated surfaces of an aircraft (e.g. canards, vertical tails, propellers, flaps, slats, etc.) that result in an identifiable and measurable flight dynamic response (e.g. roll, pitch, yaw, speed, etc.).

Although the description provided above relates to the stabilizer component 10, it is to be understood that similar analytics can be conducted with respect to vertical tail components. In such cases, an aircraft yaw, roll response model to a vertical tail input can be used to determine airspeed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An aircraft, comprising:
an airframe including first and second rotor apparatuses at upper and tail portions of the aircraft, respectively, to provide for control and navigational drive;
a stabilizer component disposed at the tail portion in a position displaced from downwash of the first and second rotor apparatuses at airspeed ranges; and
a control system configured to apply a dither actuation signal to the stabilizer component at the airspeed ranges by which an aircraft response to a stabilizer component input is measurable for airspeed estimation purposes.

2. The aircraft according to claim 1, further comprising an airspeed sensing system disposed at a forward portion of the airframe.

3. The aircraft according to claim 1, wherein the stabilizer component is displaced from downwash of the first and second rotor apparatuses below and above an airspeed range of about 10-35 knots.

4. The aircraft according to claim 1, wherein the stabilizer component comprises a horizontal stabilizer.

5. The aircraft according to claim 1, wherein the control system is a component of an on-board flight computer.

6. The aircraft according to claim 1, wherein the control system applies the dither actuation signal to a baseline stabilizer component control signal.

7. The aircraft according to claim 6, wherein the control system comprises a modeling unit disposed to be receptive of data reflective of the aircraft response to the baseline stabilizer component control signal and the dither actuation signal and configured to determine an effect of dither actuation signal application.

8. The aircraft according to claim 7, wherein the control system further comprises a filtering unit interposed between the stabilizer component and the modeling unit, the filtering unit being configured to remove noise from the data prior to the data being received by the modeling unit.

9. The aircraft according to claim 7, wherein the control system further comprises a correction unit configured to iteratively correct modeling unit inaccuracy.

10. The aircraft according to claim 7, wherein the control system further comprises a correction unit configured to correct modeling unit inaccuracy by reference to multi-variable sensitivity data versus airspeed.

11. An airspeed estimation method for use with an aircraft including a stabilizer component displaced from rotor downwash at airspeed ranges, the method comprising:
measuring an aircraft response to a baseline stabilizer component control signal at the airspeed ranges;
measuring an aircraft response to the baseline stabilizer component control signal including a dither actuation signal at the airspeed ranges; and
comparing the measured aircraft responses and estimating an airspeed of the aircraft from a result of the comparing.

12. The method according to claim 11, further comprising obtaining the airspeed of the aircraft from an airspeed sensing system disposed at a forward portion of an airframe of the aircraft.

13. The method according to claim 11, wherein the comparing comprises filtering noise from data reflective of the aircraft responses.

14. The method according to claim 11, wherein the comparing comprises iteratively correcting data reflective of the aircraft responses.

15. The method according to claim 11, wherein the comparing comprises correcting data reflective of the aircraft responses by reference to multi-variable sensitivity data versus airspeed.

* * * * *